United States Patent [19]

Jaske

[11] 4,133,071
[45] Jan. 9, 1979

[54] WINDSHIELD WIPER ARM
[75] Inventor: Robert F. Jaske, Michigan City, Ind.
[73] Assignee: Sprague Devices, Inc., Michigan City, Ind.
[21] Appl. No.: 739,983
[22] Filed: Nov. 8, 1976
[51] Int. Cl.² ............................. B60S 1/46; B60S 1/52
[52] U.S. Cl. ............................... 15/250.04; 15/250.35
[58] Field of Search .......... 15/250.35, 250.01–250.09, 15/250.34

[56] References Cited

U.S. PATENT DOCUMENTS

| | | | |
|---|---|---|---|
| 3,422,484 | 1/1969 | Carpenter | 15/250.04 |
| 3,448,482 | 6/1969 | Close | 15/250.04 |
| 3,827,101 | 8/1974 | Wubbe | 15/250.04 |
| 3,913,167 | 10/1975 | Frigon | 15/250.04 |

FOREIGN PATENT DOCUMENTS

| | | | |
|---|---|---|---|
| 2105774 | 2/1970 | Fed. Rep. of Germany | 15/250.04 |
| 1012968 | 4/1952 | France | 15/250.35 |

*Primary Examiner*—Peter Feldman
*Attorney, Agent, or Firm*—Oltsch, Knoblock & Hall

[57] ABSTRACT

A windshield wiper arm is formed of a single metal blank bent to different cross sectional configurations along its length to strengthen and reinforce it, and including a long substantially tubular portion intermediate its ends. A windshield washer nozzle is mounted at the free end of the arm and is supplied by an elongated liquid tube concealed and protected within the arm by the tubular portion of the arm and by the coil spring urging the arm toward the windshield.

3 Claims, 13 Drawing Figures

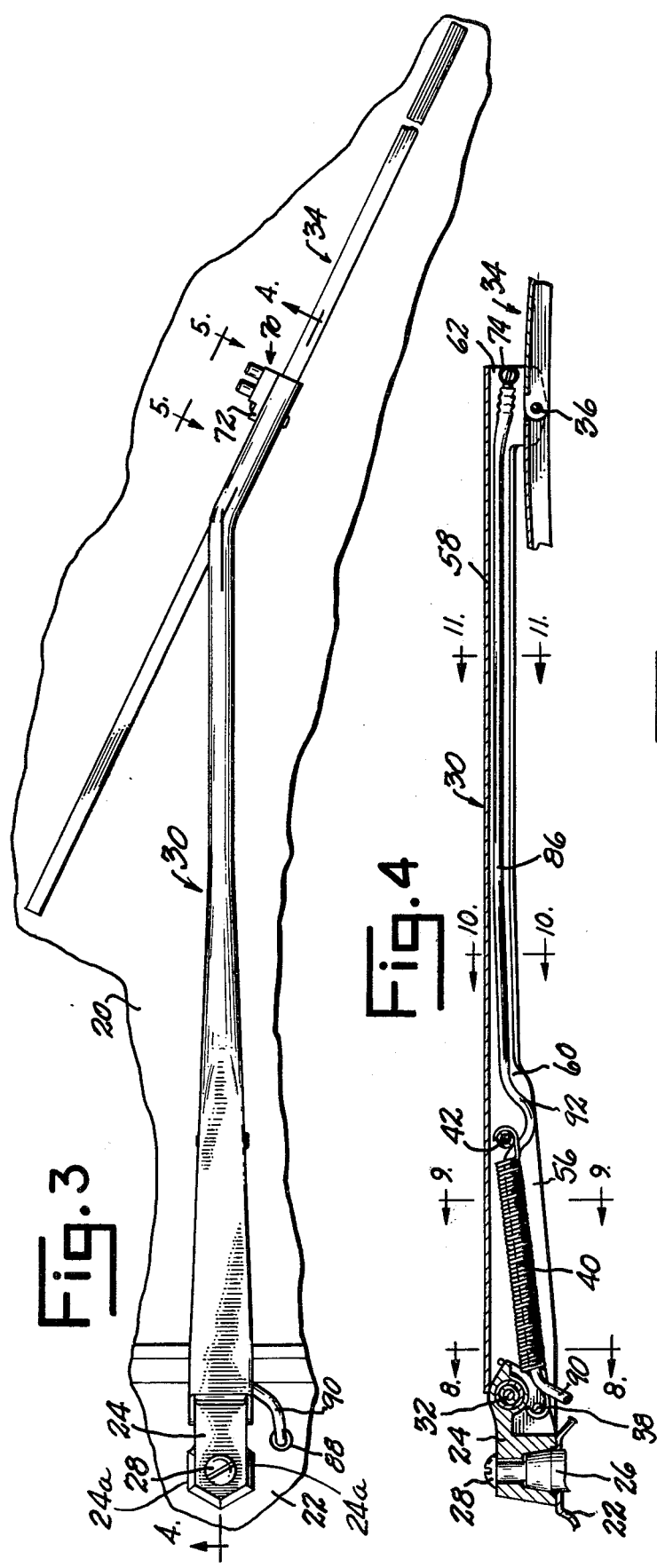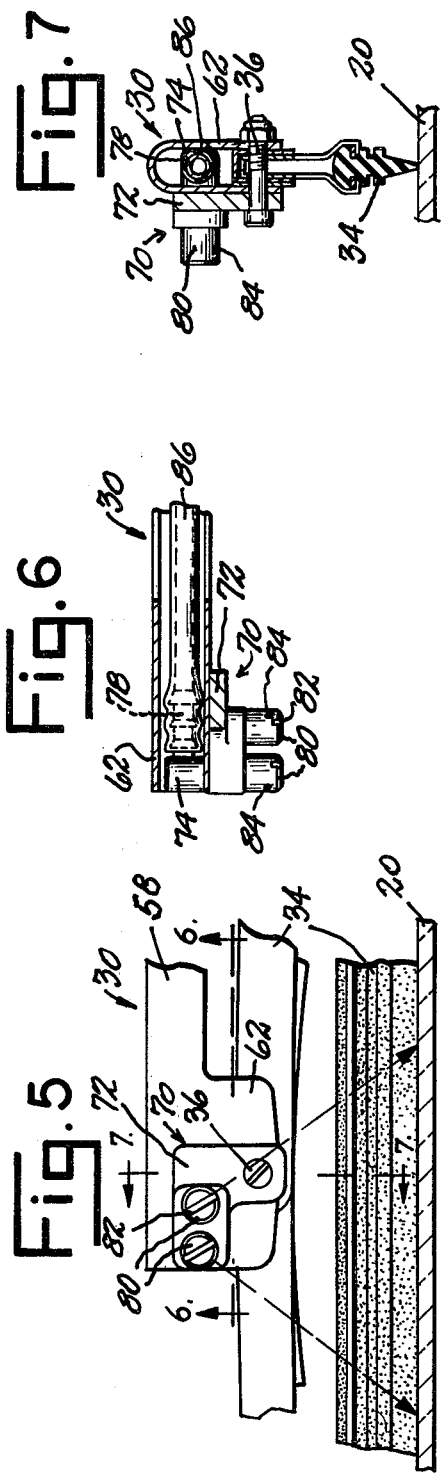

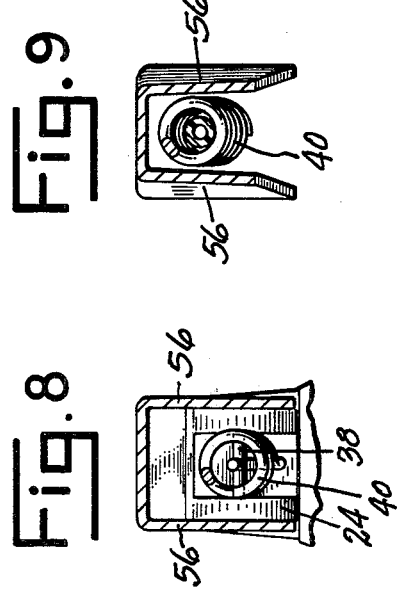
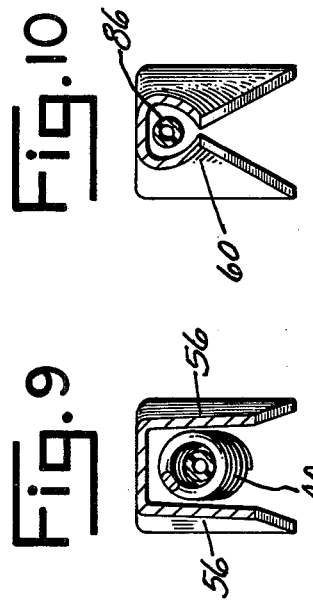
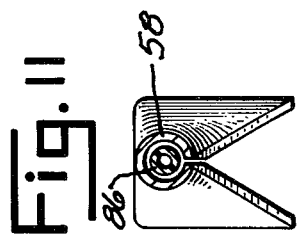
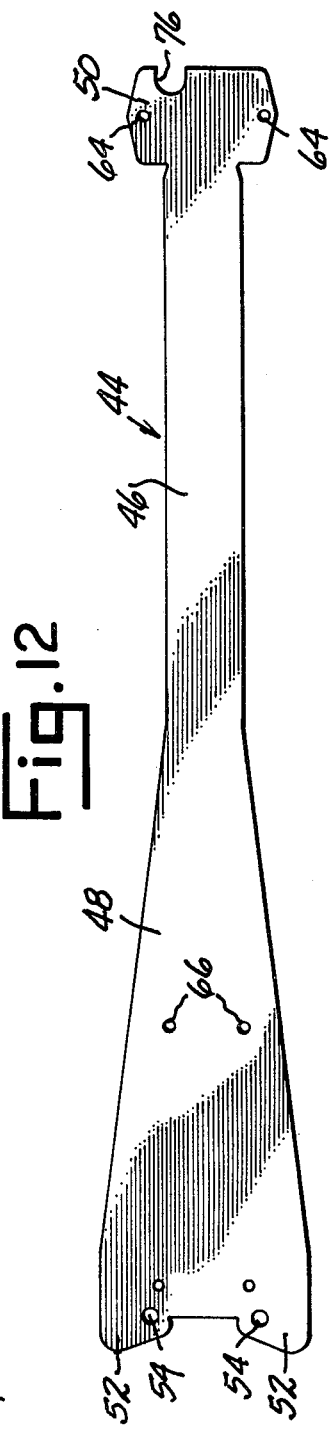
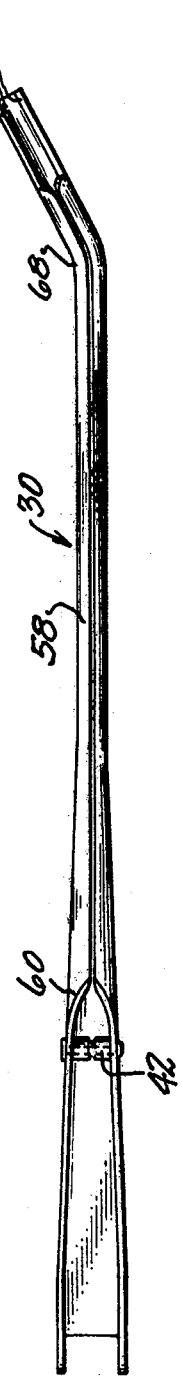

WINDSHIELD WIPER ARM

BACKGROUND OF THE INVENTION

This invention relates to improvements in windshield wiper arms, and more particularly to heavy duty windshield wiper arms for use on trucks and buses, which is provided with a liquid delivery conduit to a washer spray nozzle mounted adjacent the free end of the arm.

Heretofore, windshield wiper arms have been constructed of multiple parts resulting in an expensive construction from the standpoint of the cost of the component parts thereof and the cost of assembly thereof. Also prior windshield wiper arms have been characterized by substantial wind resistance requiring substantial spring pressure to resist wind lift. A further disadvantage or limitation of prior windshield wiper arms has been the need to locate spray nozzles in a fixed location on a vehicle body, or upon a windshield wiper arm at a position spaced a substantial distance from the point of connection of the wiper blade to the arm and consequently unequally spaced from the inner and outer margins of the area traversed by the wiper blade, so that the washing action has been less effective at the upper or outer margin of the area of the windshield traversed than at the area adjacent to the axis upon which the windshield wiper arm is swung or shifted.

It is the primary object of this invention to provide a windshield wiper arm which effectively meets and overcomes the characteristics and problems aforementioned.

A further object is to provide a windshield wiper arm which is simple in construction and formed of one piece, which is light in weight without sacrifice of strength, and whose cost of manufacture is low compared to prior arms.

A further object is to provide a windshield wiper arm providing a concealed and protected enclosure for a flexible conduit for washing liquid connected to a washer nozzle which is mounted on the arm adjacent to the point of connection of the windshield wiper blade to the arm.

A further object is to provide a windshield wiper arm which has a cross sectional configuration to provide low wind resistance during use and to minimize the tendency of the wind to lift the arm away from the windshield during travel.

Other objects will be apparent from the following specification.

In the drawings:

FIG. 3 is a plan view as viewed in the direction of arrows 3—3 in FIG. 2.

FIG. 4 is a longitudinal sectional view of the windshield wiper arm and associated parts taken on line 4—4 of FIG. 3.

FIG. 5 is an enlarged fragmentary detail view as seen in the direction of the arrows 5—5 of FIG. 3.

FIG. 6 is a fragmentary longitudinal detail sectional view taken on line 6—6 of FIG. 5.

FIG. 7 is a transverse sectional view taken on line 7—7 of FIG. 5.

FIG. 8 is a transverse sectional view taken on line 8—8 of FIG. 4.

FIG. 9 is a transverse sectional view taken on line 9—9 of FIG. 4.

FIG. 10 is a transverse sectional view taken on line 10—10 of FIG. 4.

FIG. 11 is a transverse sectional view taken on line 11—11 of FIG. 4.

FIG. 12 is a view of the metal blank from which the windshield wiper arm is formed.

FIG. 13 is a view of the arm formed from the blank shown in FIG. 12.

DESCRIPTION OF THE PREFERRED EMBODIMENT

Figure 1:
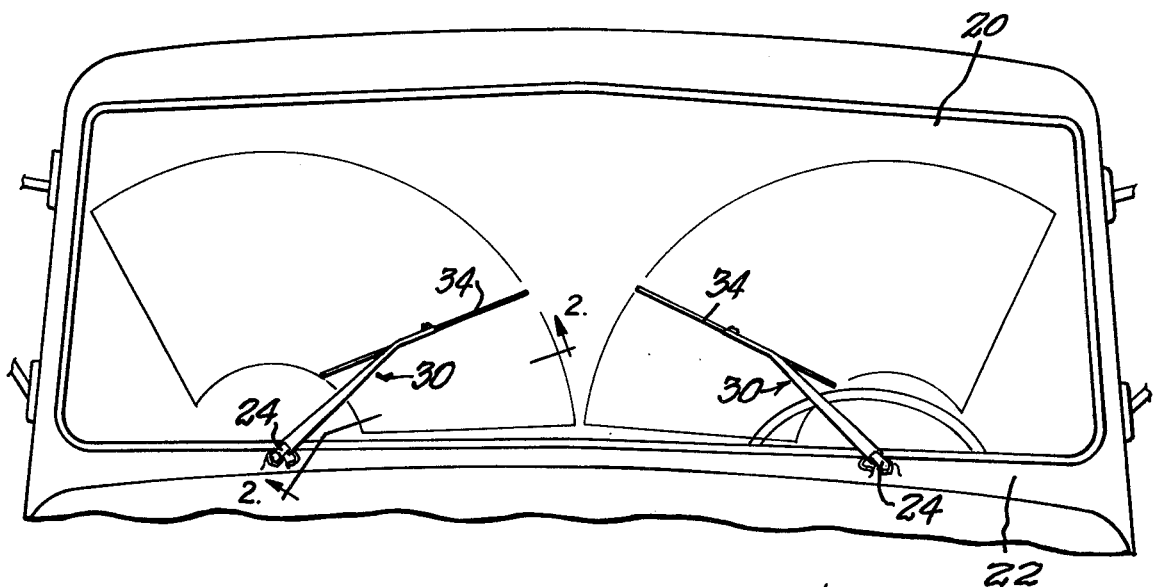
FIG. 1 is a front elevational view illustrating the windshield of a vehicle and the mounting of my windshield wiper arms and blades.
Figure 2:
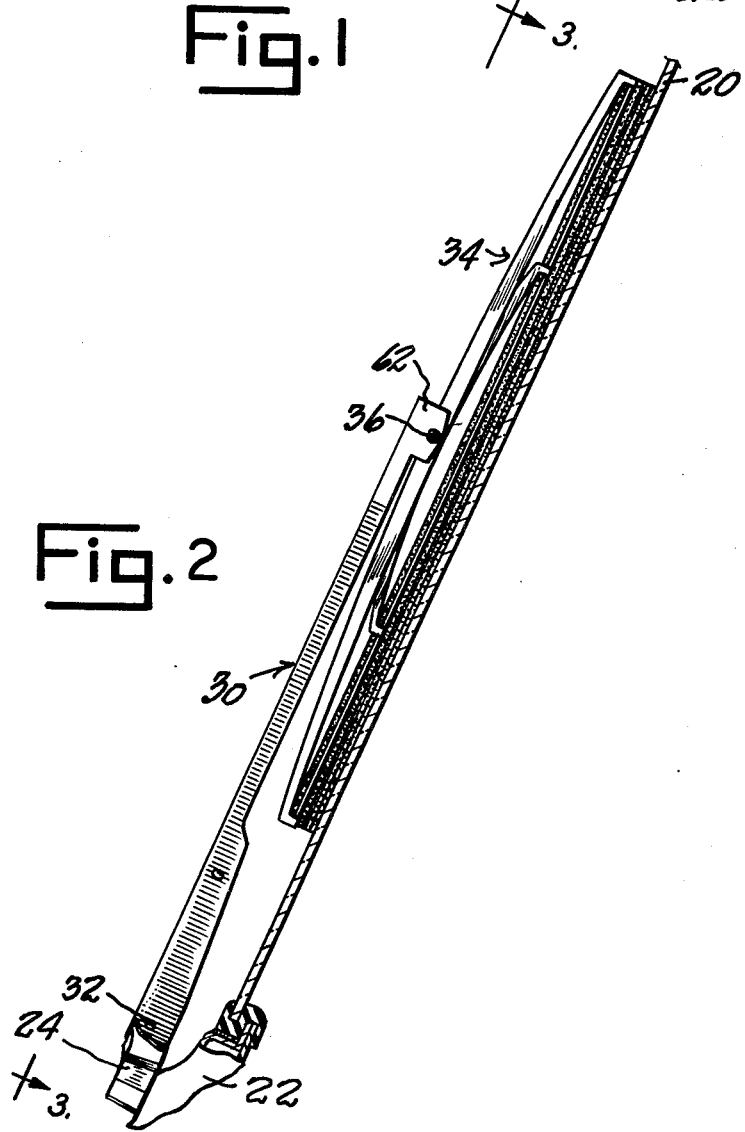
FIG. 2 is an enlarged fragmentary sectional view taken on line 2—2 of FIG. 1.

Referring to the drawings which illustrate the preferred embodiment of the invention, the numeral 20 designates the windshield of a motor vehicle which is mounted in a vehicle frame including a cowl 22. A pair of windshield wiper heads 24 each having a driving connection with a part or member 26 of a rock shaft driven by the windshield wiper motor (not shown) are secured to members 26 by anchor screws 28. Each wiper head 24 preferably includes a portion of at least partial hexagonal shape providing at least two opposite substantially parallel and flat tool-accommodating surfaces 24a, to expedite removal of said head from said shaft. Each wiper head 24 mounts a wiper arm 30 pivotally connected thereto at 32 on an axis substantially parallel to the adjacent portion of the windshield 20 so that the arm 30 may swing toward and away from the windshield. At its free or outer end each wiper arm 30 mounts a wiper blade structure 34 of any conventional character which is pivoted thereto at 36. The head 24 preferably includes a bifurcated portion as best illustrated in FIGS. 4 and 8 which mounts transverse anchor pin 38 engaged by one hooked end portion of a coil spring 40 whose opposite hooked end portion engages and anchors at a transverse pin 42 carried by the wiper arm spaced from head 24. The arrangement is such that the arms swing in arcuate paths to cause the wiper blades 34 to traverse arcuate areas of the windshield 20, as illustrated in FIG. 1, which arms press the blades firmly against the windshield as urged by the springs 40 and accommodate curvature of the windshield by virtue of the pivots 32 and 36 and the flexibility of the blades 34 and the mounting structure thereof.

Each wiper arm 30 is formed of a single piece of sheet metal of suitable gauge and strength from a blank 44 of a configuration as illustrated in FIG. 13 characterized by an intermediate portion 46 of substantially uniform width, an elongated tapering end portion 48 and an opposite short enlarged end portion 50. The tapering blank portion 48 terminates in a pair of longitudinally projecting ears 52 which are laterally spaced apart and each of which has an aperture 54. Part 48 is bent to substantially U-shape in cross section, as best seen in FIGS. 8 and 9, with the ears 52 aligning with the legs 56 of the U-shaped channel. The channel is preferably tapered longitudinally and is of a length substantially equal to the length of the blank portion 48. The free or large end of the channel fits freely around a portion of the head 24 and the apertures 54 receive the pivot pin 32 by which the arm is anchored to the head. At a point adjacent the junction of the blank parts 46 and 48 the blank is reshaped progressively, as illustrated in FIG. 10, to bring the free edges of the blank adjacent the junction progressively inwardly toward each other and toward a transversely closed position from which a tubular substantially closed cross sectional tubular portion 58 extends substantially full length of the blank portion 48, as illustrated in FIGS. 11 and 13, the convergence to which tubular portion is best illustrated in FIGS. 10 and 13 at 60. The enlarged end portion 50 of the blank is bent to U-shaped configuration at 62 with apertures 64 therein receiving or mounting the pivot pin 36. Apertures 66 in blank portion 48 accommodate or receive the anchor pin 42 which mounts one end of the spring 40. The tubular part 58 of the arm is preferably bent intermediate its ends and adjacent to the U-shaped part 62 at 68 at a slight angle if bending of the arm is required to accommodate the desired stroke of the wiper blade upon the windshield.

The free or outer end of the wiper arm 30 preferably mounts a spray nozzle 70, as best illustrated in FIGS. 3-7 inclusive. The nozzle 70 as illustrated includes a plate or base portion 72 which bears against the outer face of one arm of the U-shaped end portion 62, as seen in FIGS. 6 and 7, and is preferably anchored thereto by the pin 36 by which the blade structure is pivoted to the free end of the wiper arm. A part 74 of the nozzle projects from the base into channel 62, as through a notch 76 provided in the blank, as best illustrated in FIG. 12. Part 74 preferably substantially spans the interior of the channel and has projecting therefrom a nipple 78 extending lengthwise of and centrally of the channel 62 in the direction of the head 24. One or more cup-shaped or hollow projections 80 extend or project from base portion 72, having their outer ends closed, said parts 80 preferably being mounted upon the base 72 to accommodate rotative adjustment thereof, as by means of a tool inserted in a kerf 82 formed in the outer end wall of each member 80. Each cupshaped projection 80 has one or more apertures 84 formed therein and each extending in selected direction or angular relation to the axis or bore of the projection. Each spray nozzle has a fluid passage therein (not shown) which extends through the nipple 78, part 74, base 72 and in the interior of each cup-shaped projection 80 for discharge at apertures 84.

An elongated flexible tube 86 which is connected with a pump or other source of windshield washing liquid (not shown) preferably projects through a grommet 88 mounted in the cowl 22 adjacent to the motor shaft 26 and extends to and through the windshield wiper arm and has connection with the nipple 78 of the spray nozzle. The tube preferably includes a slack portion 90 projecting from the grommet 88 to the inner end of coil spring 40. The tube is of a diameter to fit freely within and is supported and concealed by the coil spring 40, preferably extending through the coil from end to end thereof. A second slack portion 92 of the tube at the part thereof projecting from the outer end of the coil spring 40 is bent around the anchor pin 42 while retained substantially within the confines of the channel part 56 of the arm and extends to a portion of the tube which enters and passes through the circular or tubular part 58 of the wiper arm and thence has a constrictive or other sealed fit at its end upon the nipple 78 of the spray nozzle. In this arrangement it will be seen that the tube is confined, concealed and protected within the arm throughout the major portion of its length. The tube is clear of the arm between the spring 40 and the grommet 88 only to the extent required to permit flexing thereof incident to swinging movement of the wiper arm as it is actuated in normal operation thereof.

It will be observed that the arm 30 is of one piece construction as formed from the blank 44 so as to minimize the number of parts required to interconnect the wiper blade with the motor or rock shaft 26. This produces a wiper arm of light weight which uses a minimum amount of metal and yet is of adequate strength by virtue of the reinforcing characteristics produced by the various cross sectional configurations of the arm throughout its length, that is, by its channel shaped end portions and by its tubular intermediate portion. The formation of the arm from a single blank eliminates the assembly and connection of multiple parts, minimizes the manufacturing operations required and reduces substantially the cost of production of an arm as compared to prior arms of conventional construction, without the sacrifice of any function or operating characteristic or strength required of an arm.

A further characteristic and advantage of the construction results from the tubular shape of a major portion 58 of the arm. This cross section materially reduces the wind resistance encountered during high speed vehicle travel and resulting from the pressure developed and occurring forwardly of the windshield during high speed travel. The tubular cross section tends to divert such wind resistance or deflect it laterally around the tubular section as contrasted to entrapment of such pressure as occurs at channel shaped sections and as contrasted to flat plate resistance through the full width of an arm which has a portion of flat cross section. As a result of such reduction in wind resistance, the "wind lift" tending to move the windshield wiper arm away from the windshield is substantially reduced. Consequently, less spring pressure need be exerted by the coil spring 40 to press the arm and the wiper blade toward and against the windshield. Such reduction of "wind lift" serves to increase the life of the rubber or flexible wiping portion of the blade which contacts the windshield.

A further advantage of the construction resides in the fact that the combination and arrangement of the coil spring 40, the tubular portion 58 of the wiper arm, and the liquid tube 86, wherein the tube extends through the spring and the tubular portion, serves both to conceal and protect the tube. Also, this combination and arrangement accommodates mounting of a spray nozzle at the free or outer end of the wiper arm, as at a point substantially midway between the opposite ends of the wiper blade. Such positioning of the nozzle ensures uniformity of liquid distribution across the area of the windshield which is traversed by the wiper blade, thereby producing a uniform cleaning action which is substantially superior to the cleaning action accomplished by other constructions, such as those in which a discharge nozzle is mounted fixedly upon the cowl or those in which a nozzle is mounted upon an arm intermediate the length of the arm and adjacent to the inner margin of the area of the windshield traversed by the wiper blade.

While the preferred embodiment of the invention has been illustrated and described, it will be understood that changes in the construction may be made within the scope of the appended claims without departing from the spirit of the invention.

What I claim is:
1. In combination,
   An elongated windshield wiper arm including a tubular portion intermediate its ends and channel shaped end portions integral with said tubular portion, means mounting said arm to swing alongside a vehicle windshield,
means urging said arm toward said windshield and including a coil spring anchored at its ends to said mounting means and to and within one channel arm portion, and
a spray nozzle carried by and having a part located within the channel of said arm adjacent the free end thereof,
a flexible tube connected to the part of said nozzle located within said arm channel,
means mounting said tube adjacent said arm mounting means,
said tube extending through said coil spring and said tubular arm portion,
a portion of said nozzle being positioned externally of the channel arm portion which mounts it and including a lateral projection having a discharge opening directed toward said windshield, and
securing means anchoring said external nozzle portion to its mounting channel spaced from said tube-connecting nozzle portion, the nozzle mounting channel end of said arm having a notch in which said tube-connecting nozzle part seats, said last named securing means being spaced from said notch to cooperate with said notch to provide a two point positioning of said nozzle on said arm.

2. The combination defined in claim 1, wherein said lateral nozzle projection is rotatably mounted in said external nozzle portion to selectively adjust the direction of discharge from said discharge opening.

3. In combination,
an elongated windshield wiper arm including a tubular portion intermediate its ends and channel shaped end portions,
means mounting said arm at one channel portion thereof to swing alongside a vehicle windshield,
means urging said arm toward said windshield and including a coil spring anchored at its ends to said mounting means and to and within one channel arm portion,
a spray nozzle carried by and having a part located within the channel portion at the free end of the arm, and
a flexible tube extending through the tubular arm portion and said coil spring and connected to the part of the nozzle located within the free end arm channel,
said arm mounting means including a rock shaft and a head detachably mounted on said shaft by securing means, said head having at least one set of opposite substantially parallel and flat tool accommodating surfaces.

* * * * *